United States Patent
Chlupsa

[19]
[11] 4,025,736
[45] May 24, 1977

[54] APPARATUS FOR MEASURING THE VALUE OF A VARIABLE CONDITION

[75] Inventor: John Rudolph Matthew Chlupsa, Wayne, N.J.

[73] Assignee: RFL Industries, Inc., Boonton, N.J.

[22] Filed: Sept. 15, 1975

[21] Appl. No.: 613,339

Related U.S. Application Data

[63] Continuation-in-part of Ser. No. 505,315, Sept. 12, 1974, abandoned.

[52] U.S. Cl. .................. 179/175.3 F; 324/65 R; 340/177 VA
[51] Int. Cl.² ........................................ H04B 3/46
[58] Field of Search ............ 179/175.3 F, 175.3 R; 324/65 R, 51; 340/150, 177 VA

[56] References Cited

UNITED STATES PATENTS

| | | | |
|---|---|---|---|
| 3,105,882 | 10/1963 | Meyer | 179/175.3 F |
| 3,105,883 | 10/1963 | Higson | 179/175.3 F |
| 3,417,210 | 12/1968 | Chapin | 179/175.3 F |

Primary Examiner—Douglas W. Olms
Attorney, Agent, or Firm—Rudolph J. Jurick

[57] ABSTRACT

The current flowing through a variable resistor of a transducer, responsive to a variable condition, is measured without interference with the normal operation of electrical circuitry to which the resistor is connected. Current-diverting means, connected in series with the transducer resistor, diverts the transducer current to measuring circuitry which includes a current to voltage converter operating in a manner to return the diverted current to the electrical circuitry. Means responsive to the output of the converter and to reference voltages derived from the electrical circuitry, provides output values corresponding to the state of the variable condition at the time a measurement is made.

In a specific embodiment of the invention, the apparatus monitors the internal gas pressure of a pressurized telephone cable without interfering with the normal use of a subscriber's equipment. The telephone company voltage source is used to produce a flow of current through a pressure to resistance transducer during the 'on-hook' condition of the subscriber's lines across which the transducer resistor is connected. Current-diverting means, inserted into one line of the subscriber, diverts current from the telephone company equipment to measuring circuitry which converts the current flowing through the transducer resistor to pressure values.

9 Claims, 3 Drawing Figures

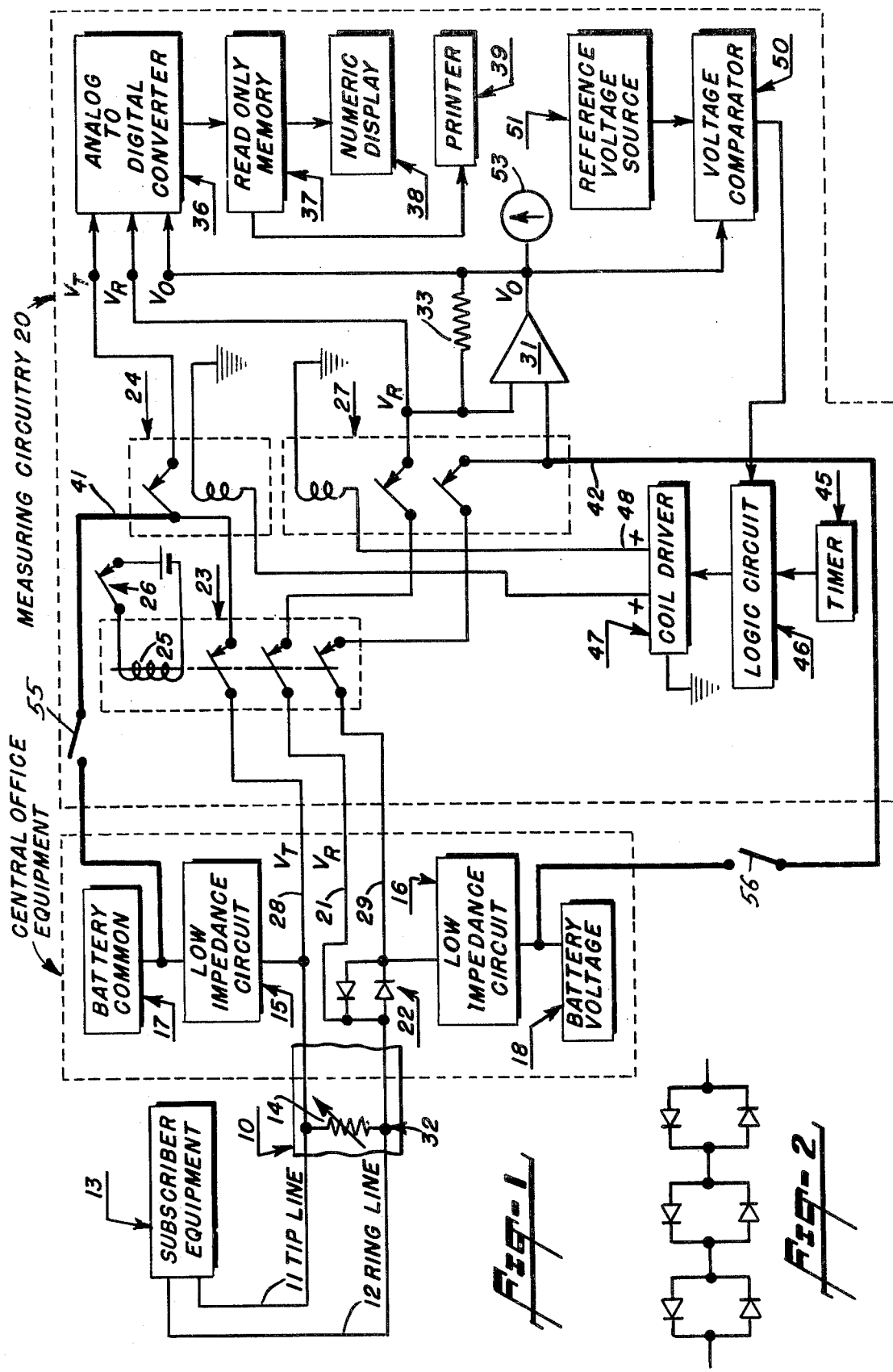

APPARATUS FOR MEASURING THE VALUE OF A VARIABLE CONDITION

The present invention is a continuation-in-part application of my now abandoned Application Ser. No. 505,315, filed Sept. 12, 1974.

BACKGROUND OF THE INVENTION

Pressurized telephone cables are used to eliminate deleterious effects of moisture on the telephone lines and periodic checking of the gas pressure is necessary to detect leaks in the cable. For this purpose, pressure to resistance transducers are implanted in the cable at spaced points, each transducer being connected across the lines of a particular subscriber. Present telephone company arrangements for measuring the resistance of a particular transducer require disconnection of the telephone equipment and the application of a relatively high d.c. voltage across the subscriber's line, thereby resulting in the loss of service to the particular subscriber during the time the measurement is made. Also, it is necessary for the telephone company to keep a record of the various subscriber's lines across which the transducers are connected. This requires wiring changes in the central office whenever a subscriber's telephone number is changed.

Apparatus made in accordance with this invention measures the pressure in a selected region of the cable without interfering with or disrupting service to the subscriber's lines across which the pressure to resistance transducer is connected. The apparatus is compatible with all existing telephone equipment and with automatic data monitoring equipment.

SUMMARY OF THE INVENTION

The apparatus utilizes the telephone company battery for providing a flow of current through a transducer resistor during the 'on-hook' condition of a subscriber's equipment, the resistor being connected across the subscriber's tip and ring lines. A diode assembly, inserted into one of the lines, diverts this current from the telephone company equipment to measuring circuitry. The diverted current is converted into a first binary code having a direct relationship to transducer resistance. Transducers presently implanted in telephone cables have non-linear pressure to resistance characteristic. Therefore, in this particular case, the first code is converted into a second code by a read only memory unit, thereby to generate a pressure value code for operation of a printer or numerical display. Sequencing switch means are provided to connect a selected transducer to the measuring circuitry and means are provided to prevent connection of the measuring circuitry to a subscriber's line when it is in use.

An object of this invention is the provision of apparatus for measuring the current flowing through a resistance type transducer without interfering with the normal operation of electrical circuitry incorporating the transducer.

An object of this invention is the provision of apparatus for monitoring the pressure of a telephone cable without interfering with or disrupting subscriber service.

An object of this invention is the provision of apparatus for monitoring the pressure of a telephone cable which apparatus is compatible with existing telephone company hardware configurations and with automatic data monitoring apparatus.

An object of this invention is the provision of cable pressure monitoring apparatus which does not require wiring changes in the central office whenever a subscriber's telephone number is changed.

An object of this invention is the provision of apparatus for monitoring the gas pressure of a telephone cable, which apparatus is independent of system noise, and voltage offset, and which functions independently of other equipment attached to a telephone line.

The above stated and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

BRIEF DESCRIPTION OF THE DRAWINGS

In the drawings wherein like reference characters denote like parts in the several views:

FIG. 1 is a schematic circuit diagram of apparatus made in accordance with this invention;

FIG. 2 is a diagram of another form of the diode assembly; and

DESCRIPTION OF PREFERRED EMBODIMENT

Figure 3:
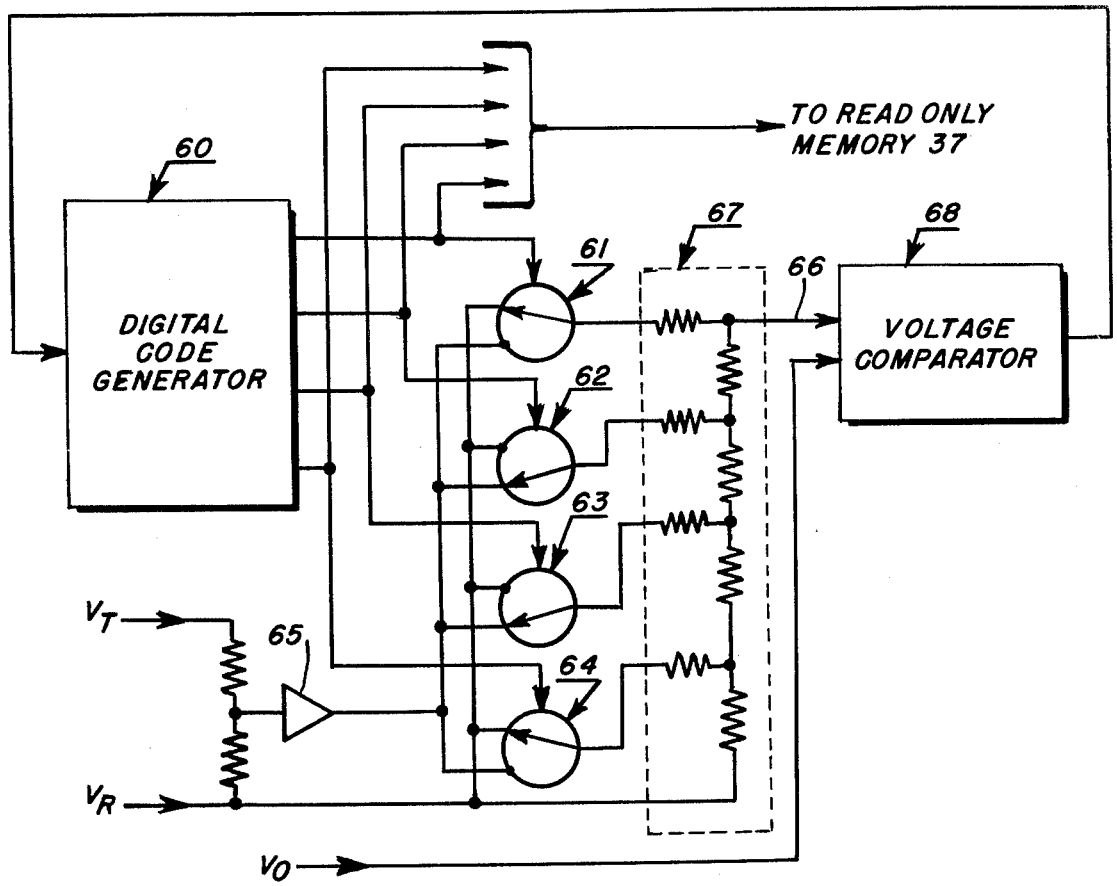
FIG. 3 is a schematic diagram of the analog to digital converter.

Referring now to FIG. 1, the numeral 10 designates a pressurized telephone cable carrying telephone lines 11 and 12 connected between the central office equipment and a subscriber's equipment 13. The lines 11 and 12 are commonly referred to as the tip line and ring line, respectively. The variable resistor 14, of a pressure to resistance transducer is permanently connected across the lines 11 and 12 at a point in the cable where monitoring of the gas pressure is to be performed. Those skilled in this art will understand that a plurality of such transducers are located at spaced points along the cable, each transducer being connected across the lines of a particular subscriber. These transducers are of conventional construction and act as variable resistors, whereby the ohmic resistance of a particular transducer corresponds to the internal gas pressure of the cable in the region of the transducer. In accordance with this invention, the current flowing through the transducer resistor is utilized to determine the gas pressure. The source of this current is the central office equipment, namely, the low impedance circuits 15 and 16 which are connected to the tip line 11 and the ring line 12, respectively. These low impedance circuits are connected to battery common 17 and battery voltage 18. Normally, this current flows out through the tip line, through the transducer resistor and back along the ring line.

For measurement purposes, the current flowing in the ring line 12 is diverted from the low impedance circuit 16 and into the measuring circuit 20 through the lead 21. Theoretically, the impedance of the circuit 16 could be utilized to divert the current to the measuring circuitry as, for example, by forcing the ring line potential to the level of the voltage source. However, the use of such voltage source as a reference voltage level for measurement purposes creates problems as the telephone line contains distortions, noise and unpredictable voltage offset. These problems are overcome, in accordance with this invention, by inserting a diode assembly 22 into the subscriber's ring line 12. This assembly blocks current from flowing into the telephone company's low impedance circuit 16 whenever the subscriber's ring line potential is forced to the potential level of the battery voltage.

The measuring circuitry includes a selector switch 23 and the switches 24 and 27. The functions of the switches 24 and 27 will be described, below. The three sets of contacts of the selector switch 23 are in the illustrated closed positions when the switch operating coil 25 is energized, thereby providing for the connection of the measuring circuitry to the three monitoring leads 21, 28 and 29. Preferably, this switch is a conventional, three-pole stepping switch which connects individual transducers, in sequence, to the measuring circuitry, thereby to provide for the automatic monitoring of gas pressure at numerous points along the cable. For purposes of illustration, the operation of the switch may be controlled by means of a manually-operable control switch 26 for connection of the particular transducer resistor to the measuring circuitry at a time selected by an operator. During the measurement period, all of the contacts of the switches 23, 24 and 27 are in the illustrated closed positions.

In order to force the ring line potential to the potential appearing on the monitor lead 29, the measuring circuitry includes a high impedance amplifier 31 having two input circuits. One input to the amplifier is the voltage appearing on the lead 29 and the other input is the voltage on the subscriber's end of the ring line. When the two amplifier inputs do not balance, current flows through the amplifier shunt resistor 33 and the magnitude of this current is such as to maintain the two inputs in balance. The diode assembly 22 causes a voltage drop of 0.6 – 1.8 volts whenever current flows through the ring line 12. The voltage potential on the monitor lead 21 is set by the amplifier to a level such that the voltage drop across the diode assembly is not large enough to cause current flow through the diodes. Consequently, all of the ring line current is diverted to the measuring circuitry. The current-blocking effect of the diode assembly is large enough so that voltage variations on the monitor lead 29 can be tolerated with no current leakage occurring through the assembly.

Because of the high impedance of the amplifier 31, all of the current flowing through the transducer resistor flows through the shunt resistor 33. Thus, there exists a direct relationship between the transducer resistance, the magnitude of the current flowing in the shunt resistor and the output voltage of the amplifier, which relationship may be expressed as follows:

$$I_s = V_o/R_s = (V_T - V_R)/R_t = I_t \qquad (1)$$

where:
$I_s$ = the current flowing in the shunt resistor,
$V_o$ = the voltage output of the amplifier,
$R_s$ = the resistance of the shunt resistor,
$V_T$ = the voltage on the tip line,
$V_R$ = the voltage on the ring line,
$R_t$ = the resistance of the transducer, and
$I_t$ = the current flow in the transducer.

The resistance of the shunt resistor and the potentials of the tip and ring lines are measurable values. Therefore, the resistance of the transducer can be directly related to the output voltage of the amplifier, as follows:

$$V = [(R_s)(V_T - V_R)]/R_t \qquad (2)$$

Other procedures may be employed to establish the value of the tip line potential, $V_T$.

Because the difference in voltage between the tip line and battery common 17 is small, the voltage potential of the latter may be substituted for $V_T$ in equation (2), above. This would eliminate the tip line connection 28 and one set of contacts of the switch 23, thereby resulting in a cost saving.

Another approach involves shorting the subscriber's tip line to the battery common. In this arrangement, there would be no error caused by potential offsets in the low impedance source 15.

The value of $V_R$ in equation (2), above, is the potential on the subscriber's end of the ring line.

Regardless of the method by which the values of $V_T$ and $V_R$ are determined, the magnitudes of these potentials will vary. The voltages $V_o$, $V_T$ and $V_R$ are applied to an analog to digital converter 36 which generates a digital output code from an analog voltage level. A schematic circuit diagram of the converter is shown in FIG. 3 to which reference now is made. A digital code generator 60 as, for example, a binary counter, generates a series of digital codes, each code line controlling one of the low impedance switches 61–64, which switches may be mechanical or electrical. A portion of the reference voltage $V_T$, applied to all of these switches through an amplifier 65, constitutes one signal input to each of the switches. A second input signal to each switch is the common voltage $V_R$. The position of the individual switches, as determined by the output code of the generator 60, will determine the voltage appearing on the lead 66 of the resistor network 67. The values of the network resistors will depend upon the specific digital code required by the particular read-only-memory identified by the reference numeral 37 in FIG. 1. The output voltage of the resistor network is compared to the voltage $V_o$ by a voltage comparator 68. If these voltages are not approximately equal, an output signal from the voltage comparator will cause the code generator 60 to generate a new code pattern. This process is repeated with different code patterns until equality is established between the two voltages applied to the voltage comparator. The code pattern providing such voltage equality corresponds directly to the level of the voltage $V_o$. With the variable voltage $V_T$ acting as the converter reference voltage, the converter provides a digital output code which is dependent on the input voltage $V_o$, which input voltage has a linear relationship to the ohmic value of the transducer resistor. For a given ohmic value of the transducer resistor, the input analog voltage $V_o$ changes in correspondence with any changes in the reference voltage $V_T$. By using $V_T$ as the reference voltage, any changes in such voltage do not effect the output of the converter. Because transducers which presently are implanted in telephone cables have non-linear pressure to resistance characteristics, the linear output code of the converter 36 is applied to a read-only-memory unit 37 which is so programmed that for each linear value input an output is generated which corresponds to the pressure in the region of the transducer. The pressure values may be presented on a numeric display 38 and/or recorded on a printer 39.

The number of test wires connected to a particular subscriber's lines will depend on the accuracy required of the monitoring system and conditions under which the system must operate. Under ideal operating conditions, the measuring procedure can be performed using only one test connection, (lead 21) to each pair of the subscriber's lines. The voltage $V_T$ would then be provided by a connection made between battery common and a contact of the switch 24, as shown by the line 41 and switch 55, and the return path for the current in the ring line would be provided by a connection as shown by the line 42 and switch 56. This arrangement eliminates the need for the monitoring leads 28 and 29, two sets of contacts of the selector switch 23 and one set of contacts of the switch 27.

For more accuracy under normal circumstances, the monitor connections 28 and 21 and the return path 42 are used.

Under conditions wherein noise, voltage offset, etc., are significant factors, the monitor connections 21, 28 and 29 are preferred.

The switches 24 and 27 function to prevent the connection of the measuring circuitry to a subscriber's telephone line when the line is in use, and to disconnect the measuring circuitry from the subscriber's line in the event the line is placed into use at a time when a measurement is being made. A timer 45 provides two spaced output signals which are applied to a logic circuit 46 controlling a coil driver 47. Normally, the logic circuit is uninhibited and the first signal from the timer results in a positive voltage appearing on the output lead 48 of the coil driver, thereby energizing the operating coil of the switch 27. The closure of the contacts of the switch 27 connects the amplifier 31 to the monitoring leads 21 and 29 through the closed contacts of the selector switch 23. The amplifier output voltage, $V_o$, which is indicative of the condition of the subscriber's line, is applied to a voltage comparator 50 which compares the level of this voltage to a reference voltage having a predetermined level and provided by a reference voltage source 51. If the subscriber's line is busy its impedance will be low and the current flowing through the leads 21 and 29 is larger than that normally encountered during the measurement procedure. Under this condition, the amplifier output voltage $V_o$ is higher than the reference voltage and the voltage comparator provides an output voltage which inhibits the logic circuit, whereupon the switch 27 opens immediately. If the subscriber's line is not in use, $V_o$ will have a level lower than that of the reference voltage, in which case there is no output from the voltage comparator and the logic circuit remains uninhibited and in condition to respond to the second signal from the timer 45. The second signal from the timer results in a positive voltage appearing on the two output leads 48 and 47 of the coil driver. This results in the energization of the operating coils of the two switches 27 and 24. The now-closed contacts of the switch 24 connect the measuring circuitry to the lead 28, and the now-closed contacts of the relay 27 connect the amplifier to the leads 21 and 29. However, if the subscriber's line is placed into use when the switches 24 and 27 are closed, the logic circuit will again be inhibited and these switches open immediately. It may here be pointed out that the first signal from the timer has a short time duration, of the order of 15 milliseconds, which is sufficient for checking the condition of the subscriber's line. The second signal from the timer has a longer time duration, of the order of 200 milliseconds, which exceeds the time required for making a measurement. The output voltage of the amplifier may be monitored, as by a voltmeter 53, having a scale suitably marked to provide an operator with a visual indication of the condition of the subscriber's line.

In the described, three-wire connection of the measuring circuitry to the subscriber's line, the current flow in the measuring circuitry is 50–500 microamperes, whereas the normal current flowing in the subscriber's line is approximately 80 milliamperes. Consequently, the connection of the measuring circuitry to a line which is in use does not produce an objectionable, audible click.

The diode assembly 22 is shown inserted into the ring line 12, but it is apparent that such assembly can be inserted into the tip line, in which case the polarity of the voltages applied to the analog to digital converter 36 would be altered accordingly. Under normal circumstances, the illustrated diode assembly is satisfactory for diversion of the current flowing through the transducer resistor to the measuring circuitry. However, in long lines, noise, voltage offsets, etc., may result in sufficient electrical energy insertion into the system so that this particular diode assembly may not provide the current-blocking effect required. In order to increase the current-blocking effect, a connected series of diode assemblies, as shown in FIG. 2, can be used.

Although the invention has been described with specific reference to monitoring the pressure in a telephone cable, it will be apparent that the described measuring system is adapted for use in other applications. For example, a variable resistance type transducer may be responsive to the level of water in a reservoir and connected in appropriate circuitry for providing an indication of water level in a local office. In such case, the described measuring system can be used for periodic transmission of water level readings to a remote central office.

Having now described the invention what I desire to protect by letters patent is set forth in the following claims.

I claim:
1. Apparatus for measuring the value of a variable condition, which apparatus comprises,
   a. a transducer responsive to changes in the variable condition and including a variable resistor having one end connected to a voltage source,
   b. a pair of reversely-disposed diodes connected in parallel, said diodes being connected between the other end of said resistor and the voltage source,
   c. a high impedance amplifier having first and second input circuits and an output circuit,
   d. a shunt resistor connected between the first input circuit of the amplifier and the output circuit,
   e. an analog to digital converter,
   f. first means for applying to the first input circuit of the amplifier the voltage $V_1$ appearing on the said other end of the transducer resistor,
   g. second means for applying a voltage $V_2$ to the second input circuit of the amplifier, said voltage being derived from said voltage source,
   h. circuit elements applying the voltages $V_1$ and the amplifier output voltage $V_o$ to the converter,
   i. third means for applying a voltage $V_3$ to said converter, said voltage being derived from said voltage source, said converter generating a digital output code corresponding to the ohmic value of the said variable resistor, and j. means converting said output code to values of the variable condition.

2. Apparatus as recited in claim 1, wherein the said first and second means includes two sets of normally-open contacts of a first relay having an operating coil, wherein the said third means includes a set of normally-open contacts of a second relay having an operating coil, and including means for energizing the operating coils of said relays.

3. Apparatus as recited in claim 2, wherein the transducer is disposed in a pressurized telephone cable, wherein the transducer resistor is connected across the tip and ring lines connecting a subscriber's equipment to a central office, and wherein the said voltage source is the central office battery.

4. Apparatus as recited in claim 3, wherein the said means for energizing the operating coils of the relays comprises a coil driver controlled by a normally uninhibited logic circuit, means applying a first and second control signals to the logic circuit, said second signal having a longer time duration than said first signal; said coil driver energizing the operating coil of said first relay in response to the first control signal passing through the logic circuit and said coil driver energizing the operating coils of both relays in response to the second signal passing through the logic circuit.

5. Apparatus as recited in claim 4, including means inhibiting the logic circuit when the amplifier output voltage exceeds a predetermined magnitude.

6. Apparatus as recited in claim 5, wherein the means inhibiting the logic circuit comprises a voltage comparator having an output circuit connected to the logic circuit, a source of reference voltage, and circuit elements connecting the amplifier output circuit and the source of reference voltage to the comparator, said comparator providing an output voltage which inhibits the logic circuit when the amplifier output voltage is greater than the reference voltage.

7. Apparatus as recited in claim 6, wherein the voltage $V_2$ is the ring line voltage and the voltage $V_3$ is the tip line voltage.

8. Apparatus as recited in claim 6, wherein the transducer has a non-linear pressure to resistance characteristic, and including a read only memory unit responsive to the output code of said converter, said memory unit programmed to generate an output corresponding to the pressure values.

9. Apparatus as recited in claim 6, including a selector switch having an operating coil and three sets of normally-open contacts, the first set of contacts being connected in series with one set of contacts of said first relay, the second set of contacts being connected in series with the other set of contacts of said first relay, and the third set of contacts being connected in series with the contacts of said second relay; and means for energizing the operating coil of said selector switch.

* * * * *